United States Statutory Invention Registration [19]

[11] Reg. Number: H969

Yee [43] Published: Oct. 1, 1991

[54] FIRE, TEMPERATURE AND SHOCK RESISTANT EXPLOSIVES

[75] Inventor: Tucker T. Yee, Ridgecrest, Calif.

[73] Assignee: The United States of America as represented by the Secretary of the Navy, Washington, D.C.

[21] Appl. No.: 177,574

[22] Filed: Mar. 28, 1988

[51] Int. Cl.[5] ..... C06B 45/10

[52] U.S. Cl. ..... 149/19.91; 149/92

[56] References Cited

U.S. PATENT DOCUMENTS

| | | | |
|---|---|---|---|
| 3,728,170 | 4/1973 | Stott et al. | 149/19 |
| 3,804,683 | 4/1974 | Baldwin et al. | 149/19.5 |
| 4,050,968 | 9/1977 | Goldhagen et al. | 149/19.4 |
| 4,078,495 | 3/1978 | Ledden, Jr. | 102/49.3 |
| 4,090,894 | 5/1978 | Reed et al. | 149/19.4 |
| 4,092,188 | 5/1978 | Cohen et al. | 149/19.4 |
| 4,099,376 | 7/1978 | Japs | 60/253 |
| 4,115,167 | 9/1978 | Sbrocca | 149/19.5 |
| 4,163,681 | 8/1979 | Rothenstein et al. | 149/11 |
| 4,221,617 | 9/1980 | Rudy et al. | 149/19.5 |
| 4,343,664 | 8/1982 | Iyer | 149/11 |

*Primary Examiner*—Edward A. Miller

*Attorney, Agent, or Firm*—William C. Townsend; W. Thom Skeer; Stephen J. Church

[57] ABSTRACT

A practical, castable plastic bonded explosive (PBX) is disclosed that is resistant to fire, aerodynamic heating, and mechanical stimuli-impact. The binder is composed of 2-ethylhexyl acrylate, dioctylmaleate, N-vinyl pyrrolidone, Aerosol R-972, t-butyl perbenzoate, cobaltous acetylacetonate, and triethyleneglycoldimethylacrylate, utilizing RDX/HMX as an explosive filler.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIRE, TEMPERATURE AND SHOCK RESISTANT EXPLOSIVES

REFERENCE TO RELATED APPLICATION

This application is a substitute for application Ser. No. 06/718,964, filed Jan 31, 1985 and now abandoned.

BACKGROUND OF THE INVENTION

1. Field of the Invention

This invention generally relates to explosive compositions and binders and more particularly to RDX/HMX explosive composition which are readily castable.

2. Description of the Prior Art

Previous plastic bonded explosives (PBX) have demonstrated excellent performance and safety properties; however, existing PBX's also demonstrate a residual problem of sporadic irreversible growth during temperature cycling before or after curing. It was determined that tert-butyl hydroperoxide (t-BuOOH), a component of previous PBX compositions, in combination with cobaltous acetylacetonate (CoAA), a catalyst in previous PBX's , causes the irreversible growth. Under conditions, t-BuOOH generates oxygen gas ($O_2$) as a by-product, and this trapped gas causes the irreversible growth. The mechanistic interpretation of the decomposition reaction is demonstrated in the following equations:

$$2\ \text{t-BuOOH} + 2\ Co^{++} \rightarrow 2\ \text{t-BuO} + 2\ Co^{+++} + 2\ OH^-$$
$$2\ \text{t-BuOOH} + 2\ Co^{+++} \rightarrow 2\ \text{t-BuOO} + 2\ Co^{++} + 2\ H^+$$
$$2\ \text{t-BuOO} \rightarrow \text{t-BuOO OOBu-t}$$
$$\text{t-BuOO OOBu-t} \rightarrow 2\ \text{t-BuO} + O_2$$
$$4\ \text{t-BuOOH} \rightarrow 4\ \text{t-BuO} + O_2 + 2\ H_2O$$

Removing t-BuOOH eliminated the growth problem but increased the tensile modulus of the resulting composition. However, continued curing of the modified composition generates macroperoxy radicals and increases cross linking of the bonder polymers. Post curing at 70° C. for 24 hours accelerates termination of the macroradicals and thus stabilizes the physical characteristics of the modified composition.

More recently two free-radical redox initiation curatives were found suitable as a substitute for the curative involving the use of t-BuOOH. The new curatives are tert-butyl perbenzoate/cuprous bromide (t-BpB/CuBr) and tert-butyl perbenzoate/cobaltous acetyl-acetonate (t-BpB/CoAA), the latter of which is the preferred curative in applicant's invention.

Therefore, there remains a continuing need for a PBX of similar quality and capabilities as that of the prior art that does not exhibit the sporadic irreversible growth during temperature cycling before or after curing.

SUMMARY OF THE INVENTION

The invention is a fire, temperature, and shock resistant PBX utilizing an improved binder consisting of three monomers, 2-ethylhexyl acrylate, dioctylmaleate, and N-vinyl pyrrolidone; a colloidal silica, Aerosil R-972 (a colloidal silica, $SiO_2$, made by Degussa Corp. of N.Y.); an initiator, tert-butyl perbenzoate; a catalyst, cobaltous acetylacetonate; and a crosslinker, triethyleneglycoldimethyl acrylate with a filler fuel composition of RDX/HMX.

OBJECTS OF THE INVENTION

An object of the invention is to provide an improved plastic bonded explosive (PBX).

Another object of the invention is to provide a PBX that is fire and temperature insensitive, and generally having improved cookoff properties A further object of the invention is to yield a high performance military explosive surpassing conventional TNT based explosives.

Yet another object of the invention is to provide a PBX of low viscosity that may be conveniently cast, loaded, processed and that is generally more practical for large scale production and utilization than existing PBX's.

Still another object of the invention is to provide a PBX that can pass conventional military safety requirements.

These and other more advantageous objects, features, and advantages of the present invention will become more readily apparent and understood in view of and upon consideration of the following description of the new composition of matter invention.

DESCRIPTION OF THE PREFERRED EMBODIMENT

The plastic bonded explosive invention consists of a binder and filler explosive. The binder is prepared separate from the explosive, and contains the compounds indicated in Table 1.

TABLE 1

| Binder Composition | % by weight |
|---|---|
| Three Monomers: | |
| 2-ethylhexyl acrylate (EHA) | 39.60 |
| dioctylmaleate (bis-2-ethylhexyl maleate) (DOM) | 28.30 |
| N-vinyl pyrrolidone (NVP) | 26.50 |
| A colloidal silica: | |
| Aerosil R-972 (AER) | 4.53 |
| An initiator: | |
| tert-butyl perbenzoate (t-BpB) | 0.99 |
| A catalyst: | |
| cobaltous acetylacetonate (CoAA) | 0.10 |
| A crosslinker: | |
| triethyleneglycoldimethylacrylate (TEGDMA) | 0.10–0.50 |
| | 100% |

The explosive constituent is a coated explosive material (CXM) consisting of research and development explosive (RDX), syn-cyclotrimethylenetrinitramine, normally precoated with DOM, and a portion of high melting explosive (HMX), cyclotetramethylenetetranitramine, in an approximate ratio of RDX:HMX::97:3. The explosive may be aluminized or non-aluminized by the addition of aluminum (Al) during the mixing stage.

The explosive contains a mixture of different proportions of various granulation classes of RDX/HMX and may be aluminized for under water use of nonaluminized as indicated in Table 2.

TABLE 2

| Explosive Composition | % by weight | |
|---|---|---|
| | non-aluminized | aluminized |
| RDX/HMX Class A (1) | 8.0 | 16.8 |
| RDX/HMX Class B (2) | — | 4.8 |
| RDX/HMX Class C (3) | 18.0 | — |
| RDX/HMX Class D (4) | 47.0 | 52.0 |
| RDX/HMX Class E (5) | 27.0 | 6.4 |

TABLE 2-continued

| | Explosive Composition % by weight | |
|---|---|---|
| | non-aluminized | aluminized |
| Al | — | 20.0 |
| | 100% | 100% |

The binder and explosive when combined, contain the following compounds, delineated in Table 3 in a ratio of explosive to binder of 86:14, non-aluminized, and 88:12, aluminized:

TABLE 3

| Binder and Explosive Composition | % by weight | |
|---|---|---|
| | non-aluminized | aluminized |
| RDX/HMX (CXM) Military Explosive, Type II | | |
| RDX/HMX Class A (1) | 6.870 | 14.780 |
| RDX/HMX Class B (2) | — | 4.220 |
| RDX/HMX Class C (3) | 15.460 | — |
| RDX/HMX Class D (4) | 40.360 | 45.740 |
| RDX/HMX Class E (5) | 23.180 | 5.630 |
| Al | — | 17.640 |
| | 86% | 88% |
| BINDER | | |
| EHA | 5.590 | 4.740 |
| DOM | 4.000 | 3.390 |
| NVP | 3.750 | 3.180 |
| AER | 0.640 | 0.553 |
| t-BpB | 0.140 | 0.119 |
| CoAA | 0.014 | 0.012 |
| TEGDMA | 0.014–0.071 | 0.012–0.060 |
| | 14% | 12% |
| | 100% | 100% |

The various classes of RDX define varying granulations, particle size, of the RDX/HMX material as delineated in a U.S. Standard Sieve, Particle Size Granulations, Table.

The binder may be prepared prior to mixing with the explosive in a three step process:

1. EHA, NVP, TEGDMA and DOM are first mixed together by means conventional to the art. The amount of DOM to be added to the binder composition is determined in consideration of the amount of DOM normally precoated on RDX. If the RDX precoated DOM is not sufficient to total 28.3% of the binder, sufficient DOM is added to bring the concentration of DOM up to 28.3% of the binder, the EHA and NVP are reduced to compensate for the extra DOM in the ratio of EHA/NVP DOM::60:40.

2. CoAA is next added to the composition of step 1 and mixed well. Alternatively CoAA may be added to the explosive as precoated RDX as was the DOM, thereby effectively eliminating step 2 of binder formation.

3. The composition of steps 1 and 2 is next gradually added to a weighed out portion of AER, while concomitantly agitating the mixture well to prevent lumping.

Once the binder is prepared, the binder and filler explosive may be combined according to the following steps:

1. A weighed out portion of the premixed binder is transferred to a mixing vessel, preferably a vessel which is water jacketed and equipped to operate under reduced pressure.

2. A weighed out portion of DOM precoated RDX/HMX is added to the binder incrementally as required, stirring slowly with each increment until the filler is adequately wetted. If the CoAA was not included in the binder, it can be added with the first increment of filler. In addition, if the aluminized version is desired, aluminum is also added incrementally with the precoated RDX.

3. After the final increment is added, the mixture is stirred at a slow speed without a vacuum at ambient temperature until the mixture is fairly homogeneous and fluid.

4. The stirring speed is then increased and continued in a vacuum until the composition appears smooth, homogeneous, and fluid.

5. Peroxide curatives (t-BpB/CoAA or t-BpB/CuB) are now added, and the mixture is stirred with increased speed under ⅓ atmospheric pressure for 10 to 15 minutes.

6. The cured mixture is finally cast into desired molds.

Mixing times may vary somewhat with batch size and kettle designs; however, final mixing time should normally not require over 20 minutes even for batches of several hundred pounds,. Long mixing times after addition of peroxides should be avoided in order to afford more time for casting and clean-up prior to gelation. Fluidity will generally increase with prolonged mixing due to slight solvent action of NVP on the RDX.

For mixes over ten pound batch size, it is advisable to control temperature at 20°–25° C. by water jacketing to remove heat of mixing and increase pot life.

The speed setting will also vary with mixer design; however, preliminary mixing with a Baker Perkins 2PX mixer is conducted at a scale setting of 25, and all subsequent mixing is conducted at 60. The type of mixer used is not critical. TNT melt kettles may be used if thoroughly cleaned. TNT (trinitrotoluene) is a retarder and may inhibit polymerization if present as a contaminant The vacuum during mixing can be critical. All binder components are of relatively low volatility, and there is no appreciable loss under a high vacuum at the times and temperatures stipulated. A vacuum should be employed, however, during casting to ensure the best cured properties.

It should be noted that unlike prior PBX's one can add heat to cure the PBX of the present invention which accelerates the cure process and gives greater elasticity to the PBX.

The physical properties of the binder composition are particularly rated for their modulus increase over a period of time at ambient temperature conditions. Physical properties for the aluminized and non-aluminized compositions after 18 weeks aging are summarized in Table 4:

TABLE 4

| | PBX Physical Properties | | | | | |
|---|---|---|---|---|---|---|
| Catalyst | CoAA | | | CuBr | | |
| Crosslinker, %[a] | 0.1 | 0.3 | 0.5 | 0.1 | 0.3 | 0.5 |
| | non-aluminized | | | | | |

TABLE 4-continued

| PBX Physical Properties | | | | | | |
|---|---|---|---|---|---|---|
| Catalyst | CoAA | | | CuBr | | |
| Crosslinker, %[a] | 0.1 | 0.3 | 0.5 | 0.1 | 0.3 | 0.5 |
| Shore A hardness[b] | 33 (33) | 47 (45) | 59 (42) | 42 (34) | 54 (41) | 60 (56) |
| Tensile strength, psi[c] | 27 (24) | 40 (39) | 43 (30) | 40 (32) | 51 (34) | 65 (47) |
| $E_{MAX}$ | 14 (15) | 12 (13) | 8 (9) | 12 (18) | 19 (19) | 11 (14) |
| $E_B$ | 71 (59) | 29 (29) | 18 (17) | 26 (23) | 35 (37) | 16 (16) |
| $E_{MODULUS}$ | 420 (348) | 575 (524) | 817 (521) | 819 (523) | 1010 (427) | 1003 (612) |
| aluminized | | | | | | |
| Shore A hardness[b] | 51 (53) | 51 (53) | 54 (56) | 39 (22) | — | 64 (55) |
| Tensile strength, psi[c] | 44 (51) | 55 (56) | 58 (48) | 32 (17) | — | |
| $E_{MAX}$ | 13 (19) | 13 (17) | 14 (15) | 11 (14) | — | 15 (16) |
| $E_B$ | 26 (25) | 25 (25) | 24 (20) | 54 (44) | — | 19 (19) |
| $E_{MODULUS}$ | 491 (334) | 639 (463) | 653 (495) | 654 (251) | — | 886 (419) |

[a]TEGDMA.
[b]Numbers in parentheses are for 70° C. postcured composition
[c]All tensile strength tests were performed with mini-dogbone samples.

The modulus of the PBX can easily be affected by changes in the amount of crosslinker. Further evaluation of the new PBX show that formulations, using CuBr as initiation promoter with the same crosslinker content, usually ends with a higher tensile modulus than those of CoAA. The CuBr usually requires only about [illegible] % of the amount of CoAA used for the formulation.

Different catalysts affect the sensitivities of the PBX. The results of impact, friction, and electrostatic tests of both the ambient cured and 70° C. postcured PBX for non-aluminized and aluminized types is summarized in Table 5. The CoAA cured PBX generally has slightly better impact sensitivity over the CuBr cured PBX.

TABLE 5

| PBX Sensitivity Data | | | | | |
|---|---|---|---|---|---|
| non-aluminized | | | | | |
| Catalyst | CoAA | | CuBr | | |
| Crosslinker[a] | 0.3% | 0.5% | 0.1% | 0.3% | 0.5% |
| Impact sensitivity 50% point cm[b] | 29 (32) | 31 (33) | 28 (29) | 28 (27) | 27 (29) |
| Friction sensitivity ABL 50% point lb | 589 (>1000) | 741 (708) | >1000 (708) | 759 (741) | 832 (>1000) |
| OD 44811, 250 lb | | 20/20 | No Fires | | |
| Electrostatic sensitivity | | 10/10 | No Fires | | |

| aluminized | | | |
|---|---|---|---|
| Catalyst | CoAA | | |
| Crosslinker[a] | 0.3% | 0.4% | 0.5% |
| Impact sensitivity 50% point cm[b] | 22 (28) | 24 (26) | 24 (29) |
| Friction sensitivity ABL 50% point lb | 324 (661) | 191 (550) | 347 (661) |
| OD 44811, 250 lb | | 20/20 | No Fires |
| Electrostatic sensitivity | | 10/10 | No Fires |

[a]Crosslinker = TEGDMA.
[b]Numbers in parentheses indicate 70° C. postcure.

A small-scale cook-off of the PBX was made using four steel bomb samples containing approximately two pounds of PBX postcured at 70° C. for 24 hours. For each of the PBX's, two bomb samples were heated electrically at 2°-3° C./sec as would occur on a direct exposure to a fire. The remaining two bomb samples were heated electrically at 0.2° C./sec as would occur in a thermally protected system. All test samples exhibited relatively mild cook-off reactions, as summarized in Table 6.

TABLE 6

PBX Small-Scale Cook-Off Results (CoAA catalyst) (0.5% Crosslinker 70° C. Post-Cured)

| Formulation | SCB sample no. | Heating rate, °C./sec | Reaction time | Temp., °C. | Reaction | Remarks |
|---|---|---|---|---|---|---|
| Non-aluminized | 217 | 2.6 | 1 min 37 sec | 201 | Mild | Endothermic reaction at 188° C., billet recovered |
| | 218 | 2.4 | 1 min 43 sec | 258 | Mild | One-fifth billet recovered |
| | 219 | 0.18 | 16 min 42 sec | 221 | Mild | Endothermic at 188° C., billet recovered, bulged |
| | 220 | 0.20 | 14 min 17 sec | 221 | Mild | Sample burned |
| Aluminized | 273 | 2.45 | 1 min 34 sec | 255 | Mild | Billet recovered |
| | 274 | 2.65 | 1 min 26 sec | 245 | Mild | Billet recovered |
| | 275 | 0.20 | 16 min 2 sec | 237 | Mild | Billet recovered |
| | 276 | 0.20 | 16 min 21 sec | 238 | Mild | Billet recovered, partial recovery of explosive |

The above disclosed PBX was developed to overcome the major inherent problem of sporadic irreversible growth experienced in earlier PBX's. As a result of removing the gas producing ingredient changing the component of the formulation, and postcuring by heating, the disclosed PBX ended with fewer components, greater assurance of dimensional stability, and a reduction of porosity. These improvements, along with the high energy output and safety of the disclosed PBX make it more suitable for high performance weapon applications. Also of merit is that the disclosed PBX is easily processable utilizing conventional equipment at ambient conditions, cured at ambient or postcured at 70° C. dependent upon particular requirements. Low viscosity and excellent fluidity at the end of processing means that this PBX can give a homogeneous and high quality casting/loading of a weapon.

Obviously, numerous modifications and variations of the present composition of matter invention are possible in light of the above teachings. It should be understood that within the scope of the appended claims the invention may be practiced otherwise than as specifically described herein.

I claim:

1. In a plastic bonded explosive containing the high explosive nitramine fillers cyclotrimethylenetrinitramine (RDX) and cyclotetramethylenetetranitramine (HMX) bound in a matrix of binder substance, the improvement residing in a binder formulation comprising consisting essentially of:

about 39.5 weight percent 2-ethylhexyl acrylate (EHA);

about 28.2 weight percent dioctyl maleate (DOM);

about 26.5 weight percent N-vinyl pyrrolidone (NVP);

about 4.5 weight percent colloidal silica;

about 1.0 weight percent tert-butyl perbenzoate initiator;

about 0.1 weight percent colbaltous acetyl-acetonate catalyst; and from about 0.1 to 0.5 weight percent triethyleneglycoldimethylacrylate crosslinker.

2. A plastic bonded explosive according to claim 1, wherein said combination of RDX and HMX is in a ratio of 97 parts RDX to 3 parts HMX.

3. A plastic bonded explosive according to claim 1, wherein said high explosive filler substance to binder substance is in a ratio of 86.14.

4. In a plastic bonded explosive containing aluminum and the high explosive nitramine fillers cyclotrimethylenetrinitramine (RDX) and cyclotetramethylenetetranitramine (HMX) bound in a matrix of binder substance, the improvement residing in a binder formulation which eliminates sporadic irreversible growth during temperature cycling before or after curing, said binder formulation consisting essentially of:

about 39.5 weight percent 2-ethylhexyl acrylate (EHA);

about 28.2 weight percent dioctyl maleate (DOM);

about 26.5 weight percent N-vinyl pyrrolidone (NVP);

about 4.5 weight percent colloidal silica about 1.0 weight percent tert-butyl perbenzoate initiator;

about 0.1 weight percent colbaltous acetyl-acetonate catalyst; and from about 0.1 to 0.5 weight percent triethyleneglycoldimethyl acrylate crosslinker.

5. The plastic bonded explosive of claim 4 wherein said explosive filler is about 80 percent nitramine explosive and about 20 weight percent aluminum.

6. The plastic bonded explosive of claim 4 containing said high explosive filler and said binder in a ratio of approximately 88:12.

* * * * *